US00RE36967E

United States Patent [19]

Hu

[11] E Patent Number: Re. 36,967

[45] Reissued Date of Patent: Nov. 28, 2000

[54] ANGULAR AUTO-ADJUSTING SKID-PROOF PAD SYSTEM ON A BABY WALKER

[76] Inventor: Stephen Hu, No. 2, Ta-Tung Road, Hsin-Chu Industrial Park, Taiwan

[21] Appl. No.: 09/326,481

[22] Filed: Jun. 4, 1999

Related U.S. Patent Documents

Reissue of:

[64] Patent No.: 5,865,451
Issued: Feb. 2, 1999
Appl. No.: 08/965,292
Filed: Nov. 6, 1997

[51] Int. Cl.[7] ..... B62B 7/00

[52] U.S. Cl. ..... 280/87.051; 280/47.38; 280/87.041

[58] Field of Search ..... 280/87.051, 87.041, 280/87.042, 33.994, 47.34; 188/5, 20, 32; 403/329, 388, 386; 24/324, 662; 293/155, 128

[56] References Cited

U.S. PATENT DOCUMENTS

| | | | |
|---|---|---|---|
| 412,199 | 10/1889 | McIlhenny | 182/109 |
| 4,699,392 | 10/1987 | Ku | 280/87.02 |
| 5,366,231 | 11/1994 | Hung | 280/87.051 |
| 5,462,300 | 10/1995 | Chien | 280/87.051 |
| 5,560,626 | 10/1996 | Glazer et al. | 280/33.994 |
| 5,697,669 | 12/1997 | Yemini | 297/188.1 |
| 5,732,961 | 3/1998 | Theodoropoulos | 280/87.051 |

*Primary Examiner*—Lanna Mai
*Assistant Examiner*—Andrew J. Fischer
*Attorney, Agent, or Firm*—Pro-Techtor International Services

[57] ABSTRACT

An angular [auto-adjustive] *auto-adjusting* skid-proof pad system on a baby [stroller] *walker*, which system is provided on the bottom of the chassis of the baby [stroller] *walker* with a plurality of skid-proof pad seats which are provided thereon with a plurality of skid-proof pads of the shapes of undulated plates, and are provided on either side thereof with a protruding axle for engaging an axle hole provided each on a side plate on the chassis, the skid-proof pad seats can thus be adjusted in angular positions in the axle holes; thereby, when the rollers of the baby [stroller rush] *walker move* out inadvertently into a stair way and are suspended in the air, the skid-proof pads can provide a braking function and prevent the baby [stroller] *walker* from falling down.

6 Claims, 7 Drawing Sheets

ANGULAR AUTO-ADJUSTING SKID-PROOF PAD SYSTEM ON A BABY WALKER

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention is related to an angular [auto-adjustive] *auto-adjusting* skid-proof pad system on a baby [stroller] *walker*, and especially to such a baby [stroller] *walker* having on the bottom of the chassis thereof a structure of which pads can be automatically adjusted in tilting angles thereof in pursuance of the tilting angle of a ground surface they touch.

2. Description of the Prior Art

A conventional baby [stroller] *walker* is [subjected] *subject* to falling down stairs when it is used at a place near the stairs[, the]. *A* baby sitting in the baby [stroller] *walker* therefore may be inadvertently hurt[; hence the]. *Hence* manufacturers are hurrying to study and develop a skid-proof or braking structure to prevent [from] such falling-down and from repeated occurrence of such tragedies.

There has been a baby [stroller] *walker* with skid-proof pads provided on the bottom of the chassis for the purpose of: preventing the baby [stroller] *walker* from further falling down by friction force of the skid-proof pads when the rollers of the baby [stroller] *walker* [rush out into] *move onto* a stair way. However, such skid-proof pads are not effective, [the reason is that] *because* when one roller of the baby [stroller] *walker* [rushes out and] is suspended in the air, the chassis is tilted, and evidently, the skid-proof pads mounted thereon are tilted too[, in]. *In* this way, contact between the skid-proof pads and the ground is not in a plane, rather, it is in a line, *and* friction force [hence] is not adequate to assure prevention of further falling down of the baby [stroller] *walker*.

SUMMARY OF THE INVENTION

Accordingly, the object of the present invention is to provide a baby [stroller] *walker* having a structure [of] *in* which a plurality of skid-proof pads on the bottom of the chassis of the baby [stroller] *walker* can be automatically adjusted in tilting angles thereof[, when]. *When* the rollers of the baby [stroller rushed] *walker move* out into a stair way and [is] *are* suspended in the air, even if the skid-proof pads mounted thereon are tilted, the auto-sensitive skid-proof pads still can be automatically adjusted in tilting angles and can be constantly parallel to the ground surface[, therefore,]. *Therefore* contact between the skid-proof pads and the ground is in a plane, *and* friction force [hence] is adequate to assure prevention of further falling down of the baby [stroller] *walker*.

The present invention will be apparent in construction of its structure and functions thereof after reading the detailed description of the preferred embodiment of the present invention in reference to the accompanying drawings.

DETAILED DESCRIPTION OF THE PREFERRED EMBODIMENT

Figure 1:
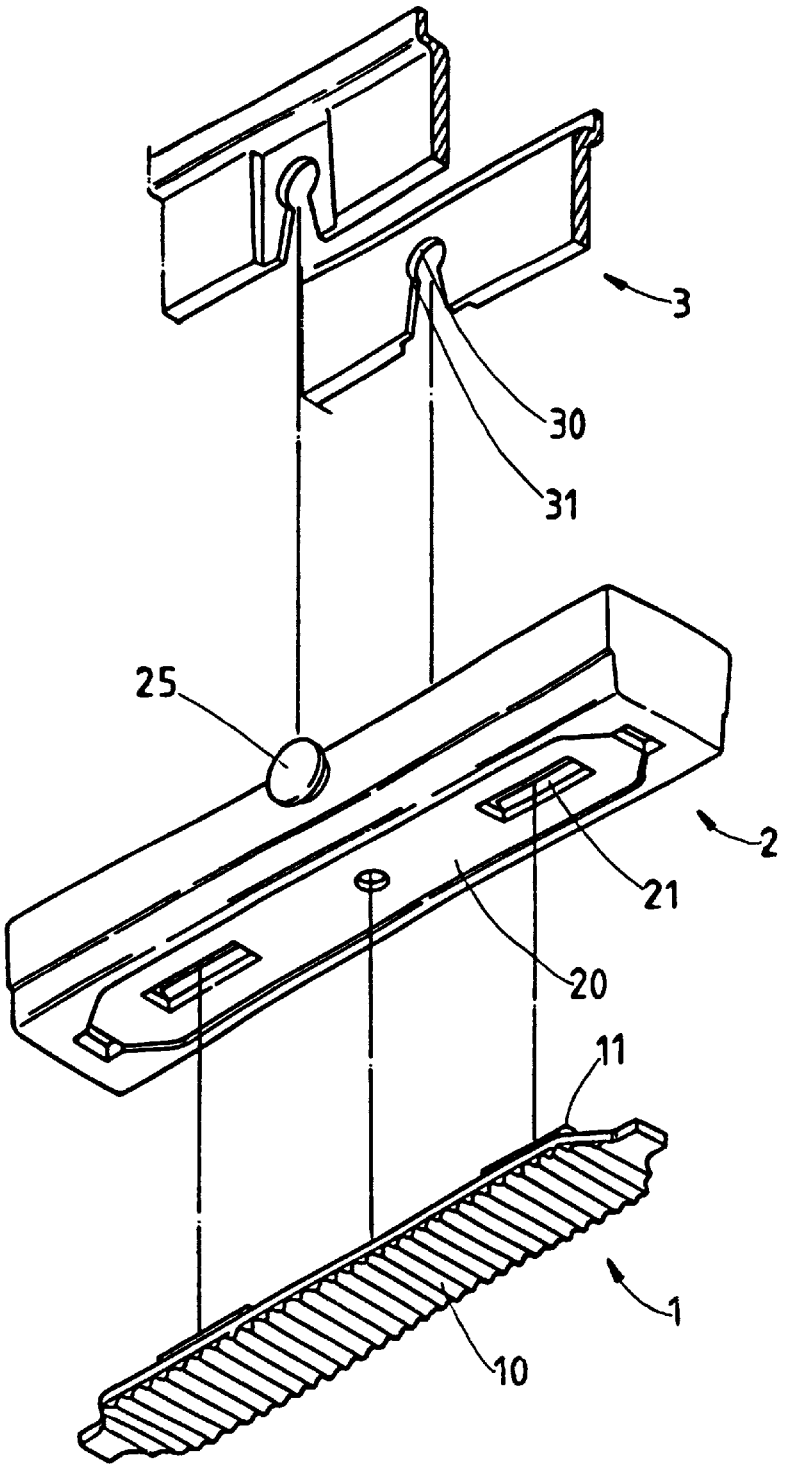
FIG. 1 is an analytic perspective view of the present invention.

[Refering firstly] *Referring first* to [FIG.] *FIGS.* 1 and 2 of the drawings, the present invention is comprised of: a plurality of skid-proof pads 1, a plurality of skid-proof pad seats 2, and pairs of side plates 3[, wherein, each]. *Each* skid-proof pad 1 is integrally assembled on a skid-proof pad seat 2, while the side plates 3 are provided for mounting and positioning and adjusting of angular positions of the skid-proof pad seats 2. Each skid-proof pad 1 is made of soft material providing skid-proof effect[, the]i . The function thereof is to obtain the skid-proof effect by friction force induced by contact thereof with the ground[, there]. *There* is an undulated plate 10 on the surface thereof, the bottom thereof is provided with a plurality of engaging members 11 protruding [downwardly] *downward*, *and* the engaging members 11 each [is] *are* comprised of an extension portion 110 and an enlarged end 111.

Figure 2:
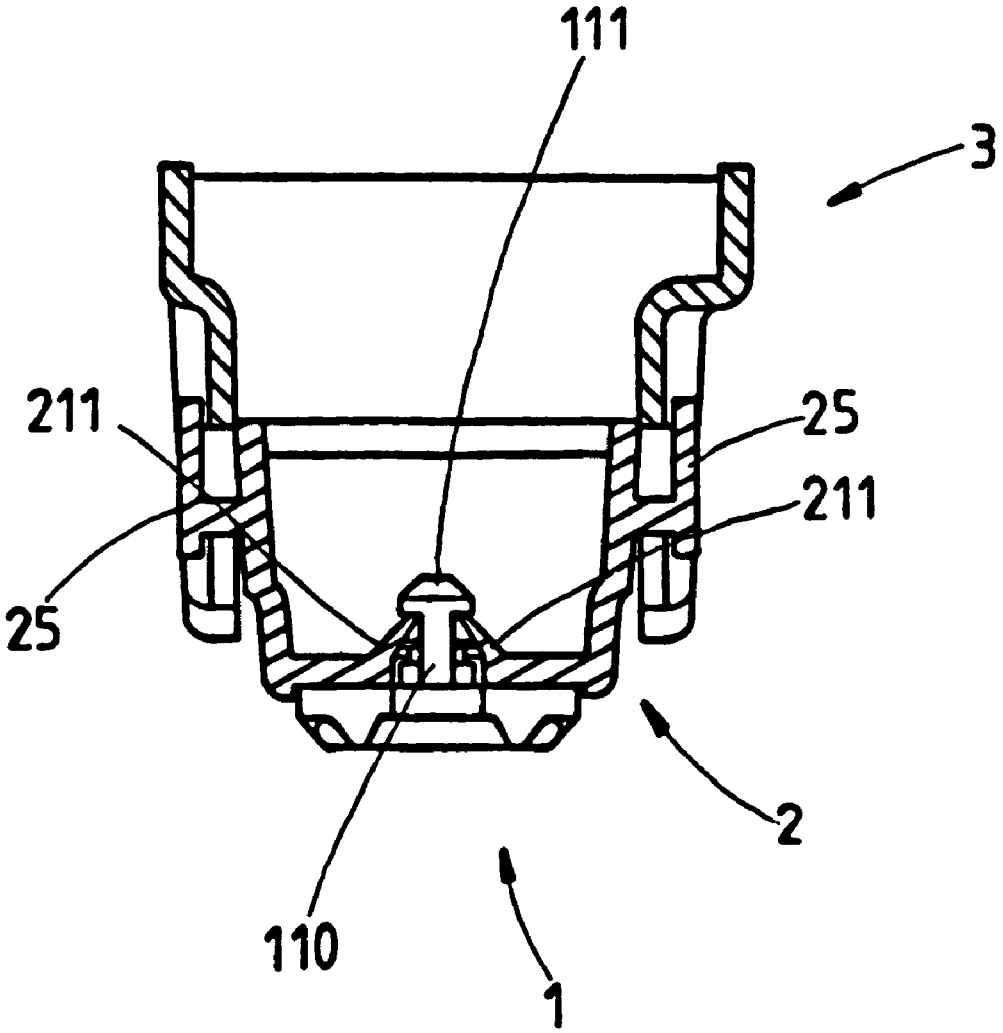
FIG. 2 is a schematic sectional view showing construction of the present invention.

Each skid-proof pad seat 2 is provided thereon with a groove 20 for receiving a skid-proof pad 1[, the]. *The* groove 20 is provided with a plurality of engaging slots 21 for engagement of the engaging members 11 of the skid-proof pad 1, such as is shown in FIG. 2[, the]. *Each of the* engaging slots 21 [each] is provided with two opposite stop pieces 211 which have a gap therebetween[, when]. *When* the enlarged end 111 at the lower end of the skid-proof pad 1 is inserted into the gap between the stop pieces 211, the skid-proof pad 1 can be engaged with the skid-proof pad seat 2[; and the]. *The* skid-proof pad seat 2 is provided on either side thereof [mutually oppositely] with a protruding axle 25.

Figure 3:
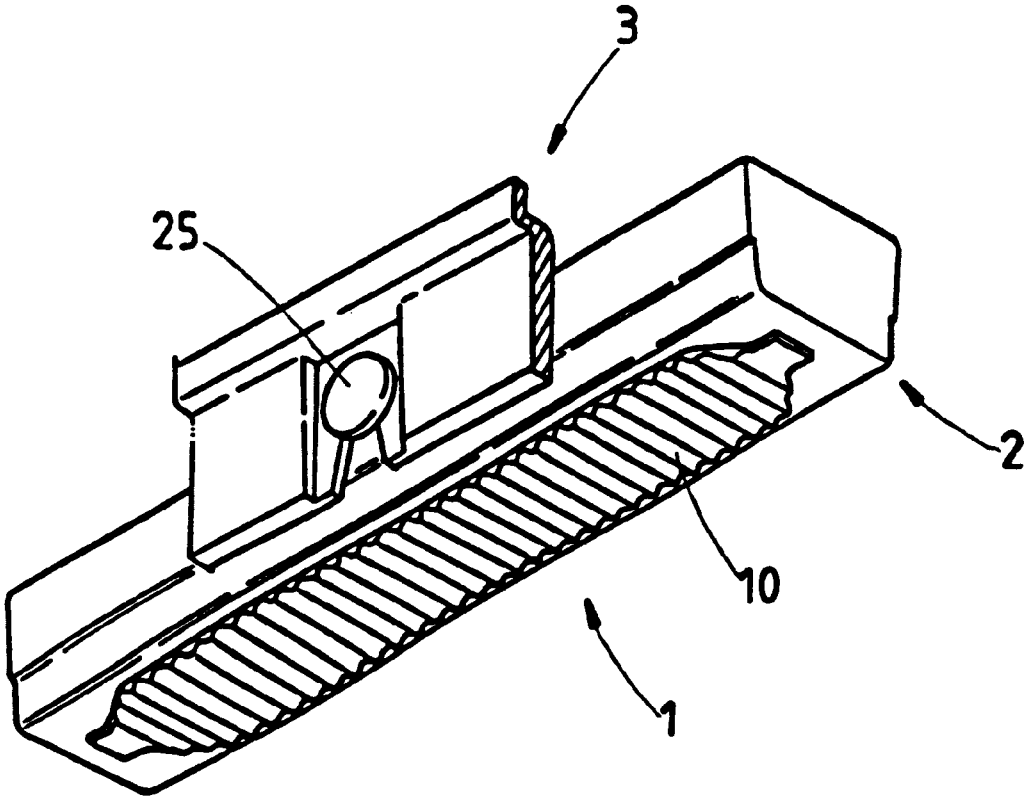
FIG. 3 is a perspective view of the [appearence of] the present invention.
Figure 4:
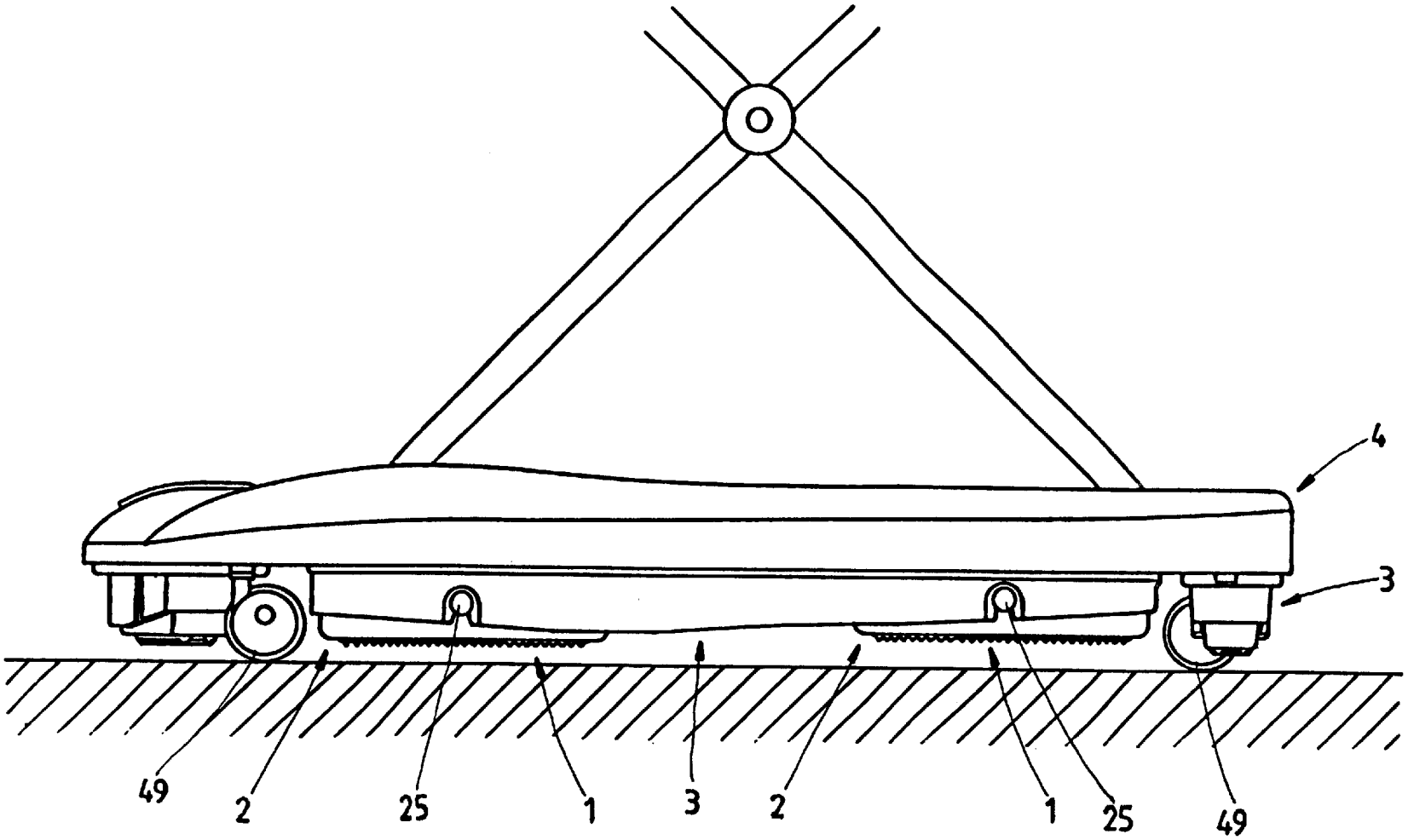
FIG. 4 is a side view showing an assembled embodiment of the present invention.
Figure 5:
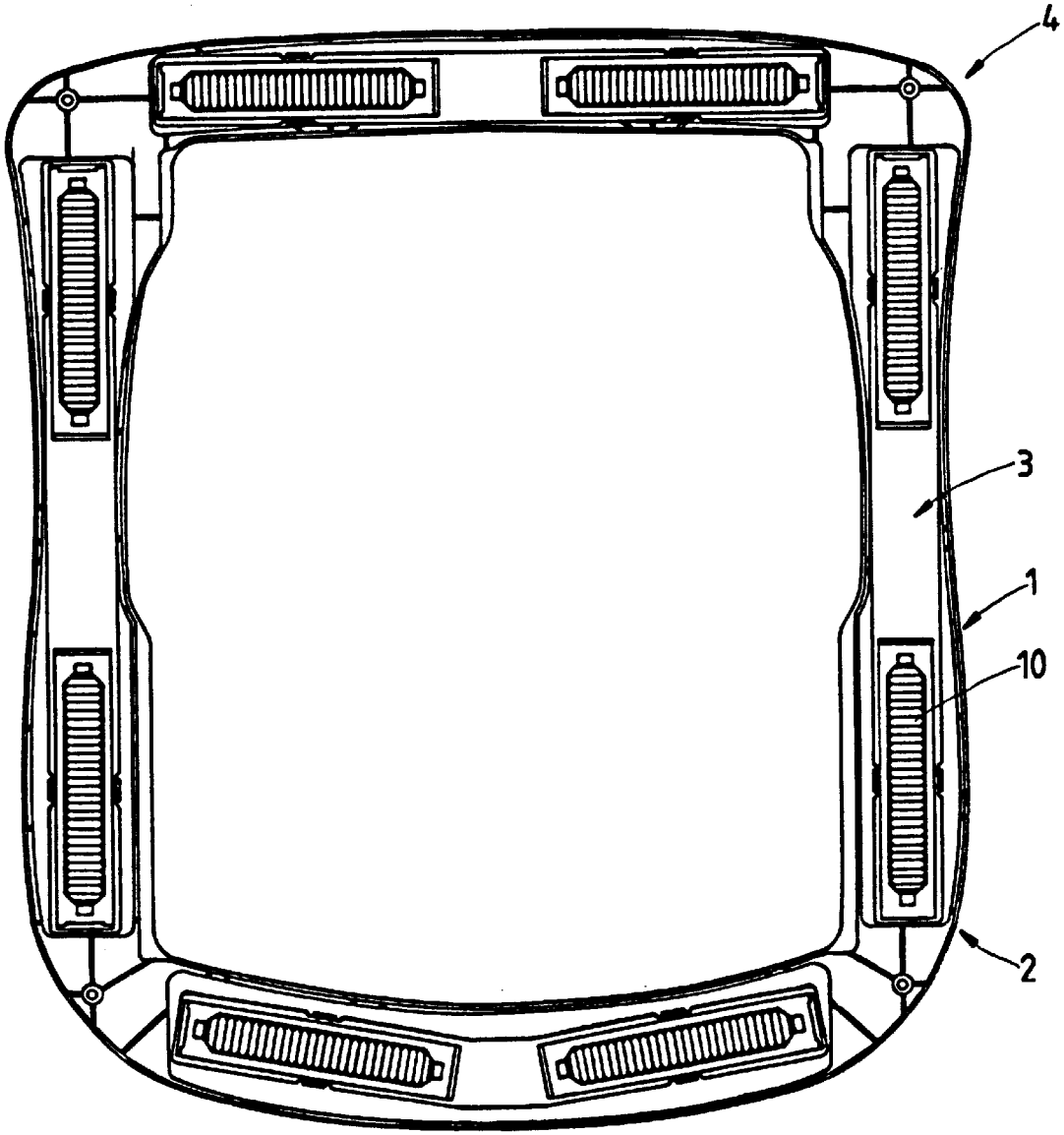
FIG. 5 is a bottom view showing the assembled embodiment of the present invention.

[The] *Each of the* side plates 3 are provided thereon [each] with an axle hole 30 which is provided on the top thereof with a reduced engaging neck 31[, the]. *The* protruding axles 25 of the skid-proof pad seat 2 can be placed in the axle holes 30 and are [not to be moved out] *secured therein* by locking of the reduced engaging necks 31 (as shown in FIG. 3)[;]. *After* putting the protruding axles 25 in the axle holes 30, the skid-proof pad seat 2 can be adjusted to any angular position between the side plates 3.

[Referring to FIG.] *FIGS.* 4 and 5 [which] show an embodiment of the present invention mounted on a baby [stroller] *walker*, wherein the side plates 3 are provided integrally on the lower portion of the chassis 4.

Figure 6:
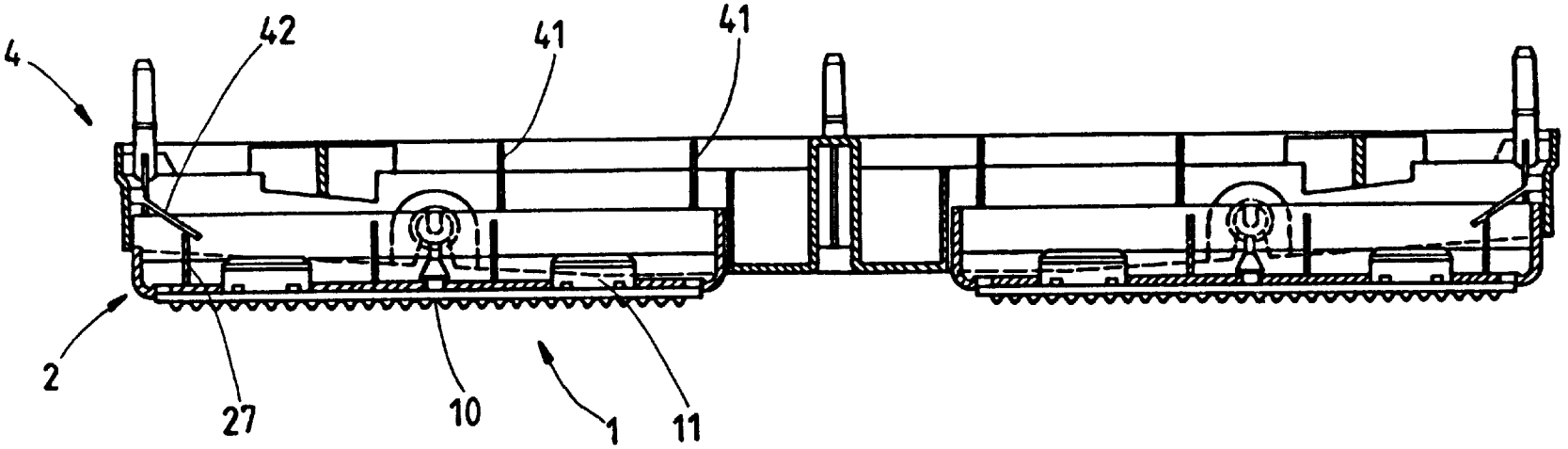
FIG. 6 is sectional view showing the structure of the present invention.

The skid-proof pad seat 2 is capable of random changing of its angular position by means of the protruding axles 25 and the axle holes 30, so that the skid-proof pad seat 2 is capable of [maintaining] *being maintained* in a parallel position to the ground surface [normally]. Referring to FIG. 6, a plurality of bracing sheets 41 and elastic sheets 42 are provided in the chassis 4, while the skid-proof pad seat 2 is also provided with a plurality of internal sheets 27, hence the skid-proof pad seat 2 can be maintained constantly in a parallel position to the ground [normally] by means of the bracing sheets 41 and elastic sheets 42; on the contrary, when the skid-proof pad seat 2 is tilted by virtue of an external force, the elastic sheets 42 will be bent and afterwards will [be recovered] *recover* when the force is removed.

Figure 7:
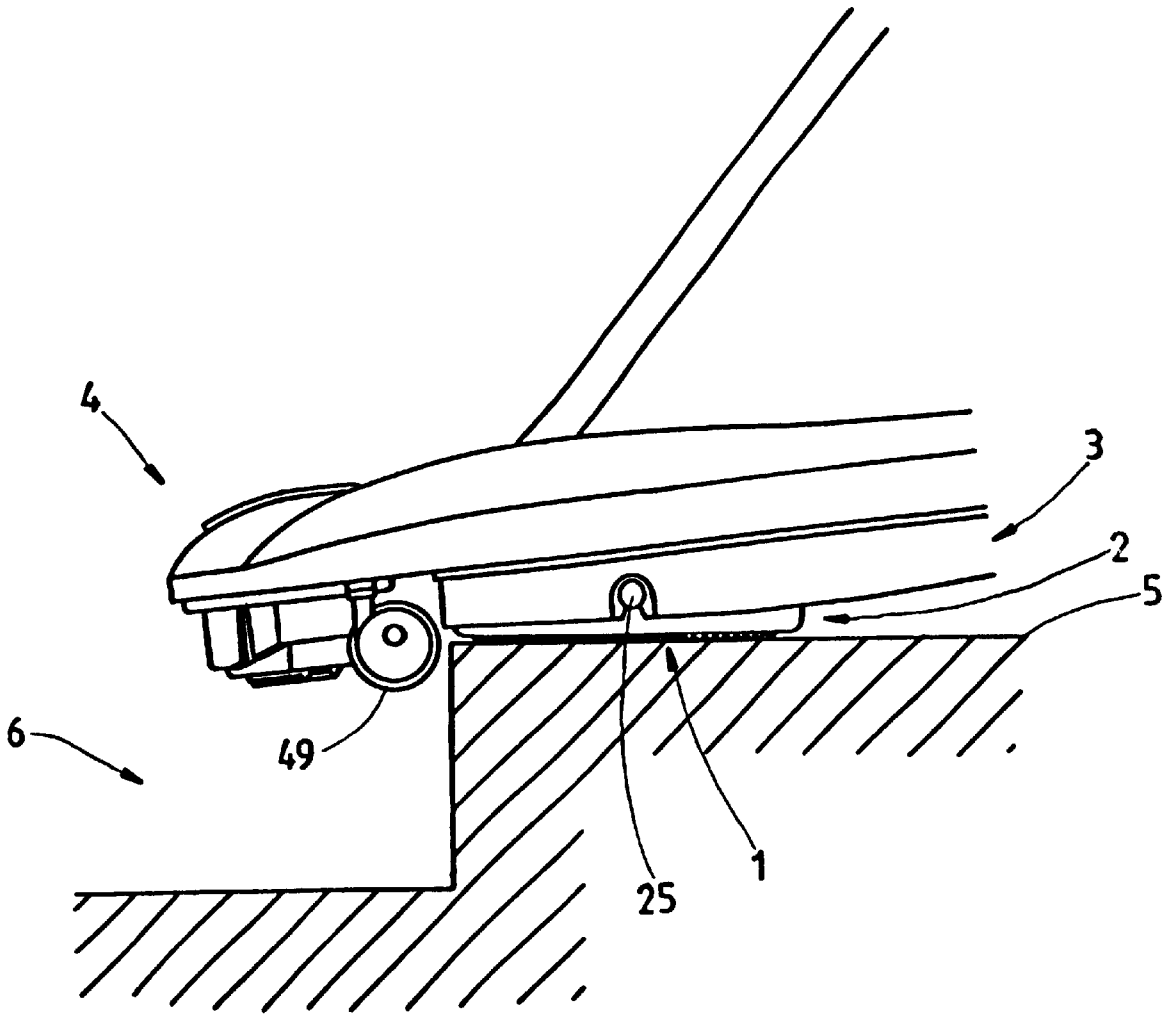
FIG. 7 is a schematic view showing [practising] *practicing* of the present invention.

Referring to FIG. 7, when a roller 49 [rushes out] *moves off* of a ground surface 5 to be suspended in the air in a stairway 6, the chassis 4 is tilted, however, the skid-proof pad seat 2 automatically adjusts its angular position to [parellel] *be parallel* to the ground surface 5 by means of the protruding axles 25 and the axle holes 30[, the]. *The* contact area of the skid-proof pad 1 and the ground surface 5 is a [whole] plane which has better friction capability than [a] *the* linear contact area of the prior art, so that the baby [stroller] *walker* can be prevented from further dropping.

In conclusion, the angular [auto-adjustive] *auto-adjusting* skid-proof pad system of the present invention on a baby [stroller providing] *walker provides* the function of skid-proof and braking when any roller of the baby [stroller rushes] *walker moves* out of a ground surface to be suspended in the air in a stair way, and especially [providing] *provides* a friction contact plane capable of [automatical] *automatically* adjusting angular positions of the skid-proof pads to be constantly parallel to the ground surface[,]. *The system* can effectively prevent the baby [stroller] *walker* from the danger of falling down stairs[, this mechanism with such function has never existed in the markets or been published, thus the present invention is provided with improveness and practicability, therefore],

[What I claim as new and desire to be secured by Letters Patent of the United States are:].

*The above disclosure is not intended as limiting. Those skilled in the art will readily observe that numerous modifications and alterations of the device may be made while retaining the teachings of the invention. Accordingly, the above disclosure should be construed as limited only by the restrictions of the appended claims.*

*I claim:*

1. An angular [auto-adjustive skid-resistant] *auto-adjusting skid-proof* pad system on a baby [stroller] *walker*, which system is provided on the bottom of the chassis of the baby [stroller] *walker*, and is comprised of a plurality of [skid-resistant] *skid-proof* pads, a plurality of [skid-resistant] *skid-proof* pad seats and pairs of side plates, wherein, each of said [skid-resistant] *skid-proof* pads is integrally assembled on one of said [skid-resistant] *skid-proof* pad seats, and is provided on the surface thereof with a plurality of undulated plates, and is provided on the bottom thereof with a plurality of engaging members protruding [downwardly] *downward*;

each of said [skid-resistant] *skid-proof* pad seats is provided thereon with a groove for receiving one of said [skid-resistant] *skid-proof* pads, said groove is provided with a plurality of engaging slots for engagement with said engaging members of said one [skid-resistant] *skid-proof* pad, and said [skid-resistant] *skid-proof* pad seat is provided on either side thereof [mutually oppositely] with a protruding axle;

said side plates are provided thereon each with an axle hole which is provided on the top thereof with a reduced engaging neck;

by said members, said [skid-resistant] *skid-proof* pads can be engaged with said [skid-resistant] *skid-proof* pad seats, thus said [skid-resistant] *skid-proof* pad seats can be pivotally mounted between said side plates by means of said protruding axles.

2. An angular [auto-adjustive skid-resistant] *auto-adjusting skid-proof* pad system on a baby [stroller] *walker* as in claim 1, wherein, *each of* said engaging members of said [skid-resistant] *skid-proof* pads [each] is comprised of an extension portion and an enlarged end.

3. An angular [auto-adjustive skid-resistant] *auto-adjusting skid-proof* pad system on a baby [stroller] *walker* as in claim 1, wherein, *each of* said engaging slots [each] is provided with two opposite stop pieces.

4. An angular [auto-adjustive skid-resistant] *auto-adjusting skid-proof* pad system on a baby [stroller] *walker* as in claim 1, wherein, said side plates are integrally formed with said chassis of said baby [stroller] *walker*.

5. An angular [auto-adjustive skid-resistant] *auto-adjusting skid-proof* pad system on a baby [stroller] *walker* as in claim 1, wherein, said chassis is provided with a plurality of bracing sheets and elastic sheets for supporting said [skid-resistant] *skid-proof* pad seats constantly in [parallel] positions *parallel* to the ground surface.

6. An angular [auto-adjustive skid-resistant] *auto-adjusting skid-proof* pad system on a baby [stroller] *walker* as in claim 5, wherein, said elastic sheets are to be contacted by a plurality of internal sheets provided in said [skid-resistant] *skid-proof* pad seats.

* * * * *

UNITED STATES PATENT AND TRADEMARK OFFICE
CERTIFICATE OF CORRECTION

PATENT NO. : Re. 36,967
DATED : September 12, 2000
INVENTOR(S) : Rozzano, Michael J.

It is certified that error appears in the above-identified patent and that said Letters Patent are hereby corrected as shown below:

IN THE CLAIMS:

Claim 25, Column 8, line 24, after "and a" delete "mojth" and replace with --mouth --.

Signed and Sealed this

Twenty-ninth Day of May, 2001

*Attest:*

Nicholas P. Godici

NICHOLAS P. GODICI

*Attesting Officer*

*Acting Director of the United States Patent and Trademark Office*